(12) United States Patent
Madonna et al.

(10) Patent No.: US 8,169,380 B2
(45) Date of Patent: May 1, 2012

(54) SYSTEM AND METHOD FOR DRIVING AND RECEIVING DATA FROM MULTIPLE TOUCH SCREEN DEVICES

(75) Inventors: Robert P. Madonna, Osterville, MA (US); James F. Allen, Sandwich, MA (US); Arthur A. Jacobson, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 1048 days.

(21) Appl. No.: 11/687,435

(22) Filed: Mar. 16, 2007

(65) Prior Publication Data

US 2008/0225008 A1  Sep. 18, 2008

(51) Int. Cl.
G09G 5/00 (2006.01)
G06F 3/041 (2006.01)
(52) U.S. Cl. .......................... 345/1.3; 345/173
(58) Field of Classification Search ............ 345/1.1–1.3, 345/2.1–2.2, 3.3–3.4, 30, 33, 44–47, 50–51, 345/156, 173
See application file for complete search history.

(56) References Cited

U.S. PATENT DOCUMENTS

| | | | |
|---|---|---|---|
| 5,986,622 A | | 11/1999 | Ong |
| 6,377,228 B1* | | 4/2002 | Jenkin et al. .................. 345/1.3 |
| 2001/0006375 A1* | | 7/2001 | Tomooka et al. ................ 345/4 |
| 2004/0150581 A1* | | 8/2004 | Westerinen et al. ........... 345/1.3 |
| 2006/0028398 A1 | | 2/2006 | Willmore |
| 2006/0077120 A1* | | 4/2006 | Domi et al. .................... 345/2.3 |
| 2007/0211072 A1* | | 9/2007 | Yoo et al. ...................... 345/600 |
| 2007/0279408 A1* | | 12/2007 | Zheng et al. .................. 345/213 |

FOREIGN PATENT DOCUMENTS

| | | |
|---|---|---|
| EP | 0 899 651 A2 | 3/1999 |
| EP | 1 202 162 A1 | 5/2002 |
| EP | 1 453 033 A2 | 9/2004 |
| WO | WO-02/46943 A2 | 6/2002 |

OTHER PUBLICATIONS

"Notification of Transmittal of the International Search Report and the Written Opinion of the International Searching Authority, or the Declaration," International Filing Date: Mar. 10, 2008, International Application No. PCT/US2008/003155, Applicant: Savant Systems LLC., Date of Mailing: Jun. 23, 2008, pp. 1-12.

* cited by examiner

*Primary Examiner* — Lun-Yi Lao
*Assistant Examiner* — Jarurat Suteerawongsa
(74) *Attorney, Agent, or Firm* — Cesari and McKenna, LLP

(57) ABSTRACT

In one embodiment, multiple touch screen devices are driven from a graphics signal. A general-purpose computer provides a graphics signal of a particular display resolution. A display segmentor is configured to divide each graphics frame of the graphics signal into a plurality of pixel groups, each pixel group associated with a particular touch screen device of the plurality of touch screen devices. The display segmentor is further configured to generate an individual graphics signal from each pixel group, each individual graphics signal having a display resolution that is lower than the particular display resolution. One or more interfaces transmit each individual graphics signal to a different touch screen device of the plurality of touch screen devices.

18 Claims, 4 Drawing Sheets

SYSTEM AND METHOD FOR DRIVING AND RECEIVING DATA FROM MULTIPLE TOUCH SCREEN DEVICES

BACKGROUND

1. Field of the Invention

The present invention relates generally to display and input devices, and more specifically to driving and receiving data from one or more touch screen devices.

2. Background Information

As electronic systems become more complicated, the limitations of traditional "button-centric" remote control units are becoming increasingly apparent. To partially address this issue, many systems now interoperate with some sort of touch screen units that include a touch sensitive liquid crystal display (LCD) to display menus, selectable icons, status information, and/or other graphics. Such touch screen units are often configured to be located some distance from the rest of the system, thereby operating as remote controls. For example, many audio/video (A/V) systems and home control/automation systems employ remote wall-mount, table-top, or handheld touch screen units to control the system or display status information from the system.

While the use of touch screen units often improves the user experience, conventional touch screen units generally are quite complex and accordingly costly. The high cost of touch screen units has limited their use, such that only very high-end systems typically employ a large number of touch screen units. Much of the complexity and cost of touch screen units is due to the typical inclusion of a general-purpose computer in each touch screen unit. In conventional configurations, a general-purpose computer is often used to receive a non-graphics data signal from an external device, and in response, generate a graphics signal to drive the LCD of the touch screen unit. Further, in many conventional configurations, the general-purpose computer also processes touch location information and converts it to commands understandable to external devices. To provide these functions, most conventional systems simply bear the cost of having a general-purpose computer in each touch screen unit.

Accordingly, there is a need for an improved system and method that facilitates the use of touch screens, yet addresses the shortcomings and limitations of conventional techniques.

SUMMARY

In an illustrative embodiment, a system and method are provided for driving multiple touch screen devices from a single graphics signal. The system and method further may include capabilities for mapping touch location information from multiple touch screen devices into a single screen space, so that touch location information may be more readily processed. The system and method may advantageously obviate the need to include a separate general-purpose computer in each touch screen device.

In one configuration, a single graphics signal, from a general-purpose computer, is passed to a touch screen device interface that includes a display segmentor. The display segmentor processes each graphics frame of the single graphics signal, in part, by dividing the graphics frame into a number of pixel groups. The pixel groups are each mapped to a particular touch screen device. The display segmentor generates individual graphics signals from each pixel group, and passes these signals to an associated video serializer. The video serializer encodes, serializes, and transmits the individual graphics signal over an associated connection port coupled to a transmission path.

A particular touch screen device receives its individual graphics signal from a transmission path, and deserializes the signal. A LCD of the touch screen device thereafter displays the graphics embodied in the individual graphics signal. A touch screen panel may be overlaid upon the LCD, to allow the LCD to function as an input device. When touched by a user, the touch screen panel generates data signals, for example x-axis and y-axis coordinates corresponding to the location of the touch. The x-axis and y-axis coordinates are passed to a data serializer, and then back to the touch screen device interface and the display segmentor provided therein.

The display segmentor, in one configuration, maps the x-axis and y-axis coordinates from all the touch screen devices into a single screen space. In response to the location in the graphics frame of the pixel group associated with the touch screen device that supplied the x-axis and y-axis coordinates, offset values are calculated and then added to the x-axis and y-axis coordinates. The offset values map the x-axis and y-axis coordinates to new x-axis and y-axis coordinates in the screen space of the graphics frame. The newly generated x-axis and y-axis coordinates in the screen space of the graphics frame are passed to a device for further processing, for example, passed back to the general-purpose computer. There, such coordinates may be used to determine user selections on the touch screen devices.

Other embodiments are disclose below that include additional, and/or alternate features, and accordingly this summary should not be interpreted as to limit or otherwise restrict the scope of the invention described herein.

BRIEF DESCRIPTION OF THE DRAWINGS

The description of an illustrative embodiment below refers to the accompanying drawings, of which.

DETAILED DESCRIPTION OF AN ILLUSTRATIVE EMBODIMENT

Figure 1:
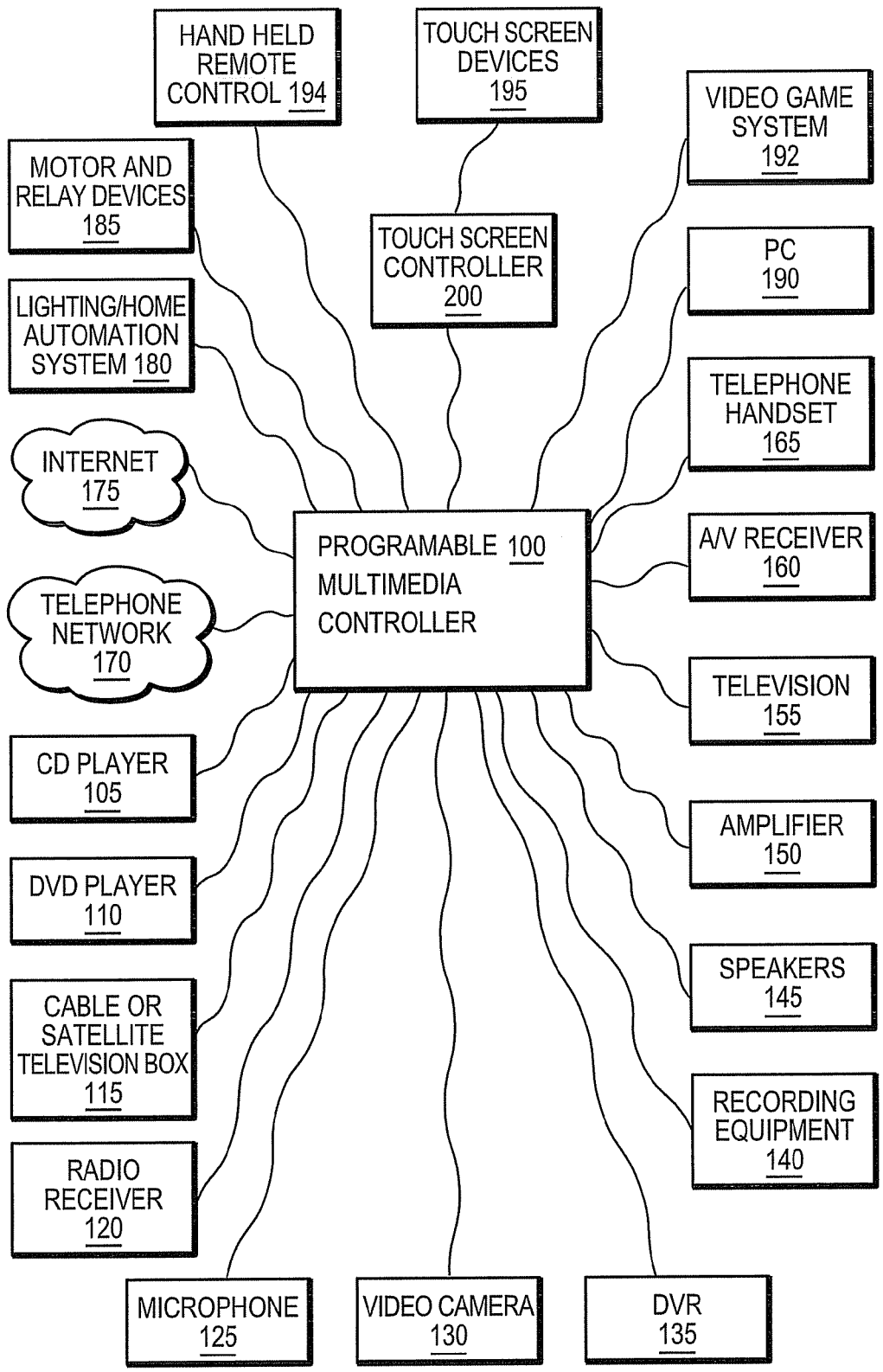
FIG. 1 is a block diagram of an example programmable multimedia controller (shown interconnected to a number of example external devices), with which an touch screen controller for driving and receiving data from multiple touch screen devices may be employed.

FIG. 1 is a block diagram of an example programmable multimedia controller 100 (shown interconnected to a number of example external devices), with which an example touch screen controller 200 for driving and receiving data from multiple touch screen devices 195 may be employed. The term "programmable multimedia controller" should be interpreted broadly as a device capable of controlling, switching data between, and/or otherwise interoperating with, a variety of electrical and electronic devices, such as audio, video, telephony, data, security, motor-operated, relay-operated, and/or other types of devices. By interacting with these devices, the programmable multimedia controller 100 may implement an integrated multimedia control solution.

The example programmable multimedia controller 100 may communicate with and/or control a large number of different audio and/or video components. Such components may include devices that typically function as content sources, devices that typically function as content destinations, devices that process, switch, or otherwise manipulate content, and/or other devices. For example, the programmable multimedia controller 100 may be coupled, or otherwise interface with, a compact disk (CD) player 105, a digital video disc (DVD) player 110, a cable or satellite television box 115, a satellite or terrestrial radio receiver 120, a microphone 125, a video camera 130, a digital video recorder (DVR) 135, other recording equipment 140, speakers 145, an amplifier 150, a television or monitor 155, an A/V receiver 160, and/or other audio and/or video components.

The programmable multimedia controller 100 may also communicate with and/or control one or more telephony devices, such as a telephone handset 165 or other telephony device, as well be coupled to, or otherwise interface with a telephone network 170. The telephone network 170 may be a publicly switched telephone network (PSTN), an Integrated Services Digital Network (ISDN), a Voice over Internet Protocol (VOIP) network, or another type of telephone network. Similarly, the programmable multimedia controller 100 may also be coupled to, or otherwise interface with, a computer communications network, such as the Internet 175.

In addition, the programmable multimedia controller 100 may communicate with and/or control a lighting and/or home automation system 180, for example a system that operates according to the X10™ protocol developed by Pico Electronics, the INSTEON™ protocol developed by SmartHome, Inc, the CEBus standard managed by the CEBus Industry Council, or another automation or control protocol. Similarly, the programmable multimedia controller 100 may communicate with and/or control motor and/or relay operated devices 185, which may include, for example, a heating, ventilation, and air conditioning (HVAC) system, an irrigation system, an automatic window shade or window blind system, an electronic door lock system, a surveillance system, and/or other types of systems and devices. Finally, the programmable multimedia controller 100 may communicate with, interface with, and/or control a personal computer (PC) 190, a video game systems 192, or any of a wide variety of other devices.

One or more hand held remote control units 194 may be provided to manage some, or all, of the programmable multimedia controller's functionality. A hand held remote control unit 170 generally includes a plurality of buttons, and/or other sensors, such as an annular touch sensor, and may, or may not, include an integrated display screen, for example a liquid crystal display (LCD). Hand held remote control units 194 may communicate with the programmable multimedia controller 100 via a wired connection, such as Ethernet over Category 5 (CAT5) cable, Universal Serial Bus (USB), an IEEE 1394 interface (commonly known as FireWire®) or a wireless connection, such as an infra-red (IR) link, a radio-frequency (RF) link, a Bluetooth® link, a ZigBee® link, a WI-FI link, or another appropriate wireless data connection.

Further, one or more touch screen devices 195 may be provided to manage some or all of the programmable multimedia controller's functionality. A touch screen device 195 generally includes a touch sensitive liquid crystal display (LCD) that may display menus, indicators, selectable icons, selectable controls, text, graphics, full-motion video and/or other content. A touch screen device 195 may be configured to have a form factor suited for wall-mount, table-top use, hand-held use, or another type of use. According to one embodiment, each touch screen device 195 may interface with a touch screen controller 200. The interface may be an Ethernet over Category 5 (CAT5) cable connection, or alternately any of a variety of different wired connections, for example Universal Serial Bus (USB), IEEE 1394 (commonly known as FireWire®), or another type of wired connection, and/or any of a variety of different wireless connections, such as RF, WI-FI, or another type of wireless connection. Similarly, the touch screen controller 200 may interface with the programmable multimedia controller 100 via any of a variety of types of connections.

Figure 2:
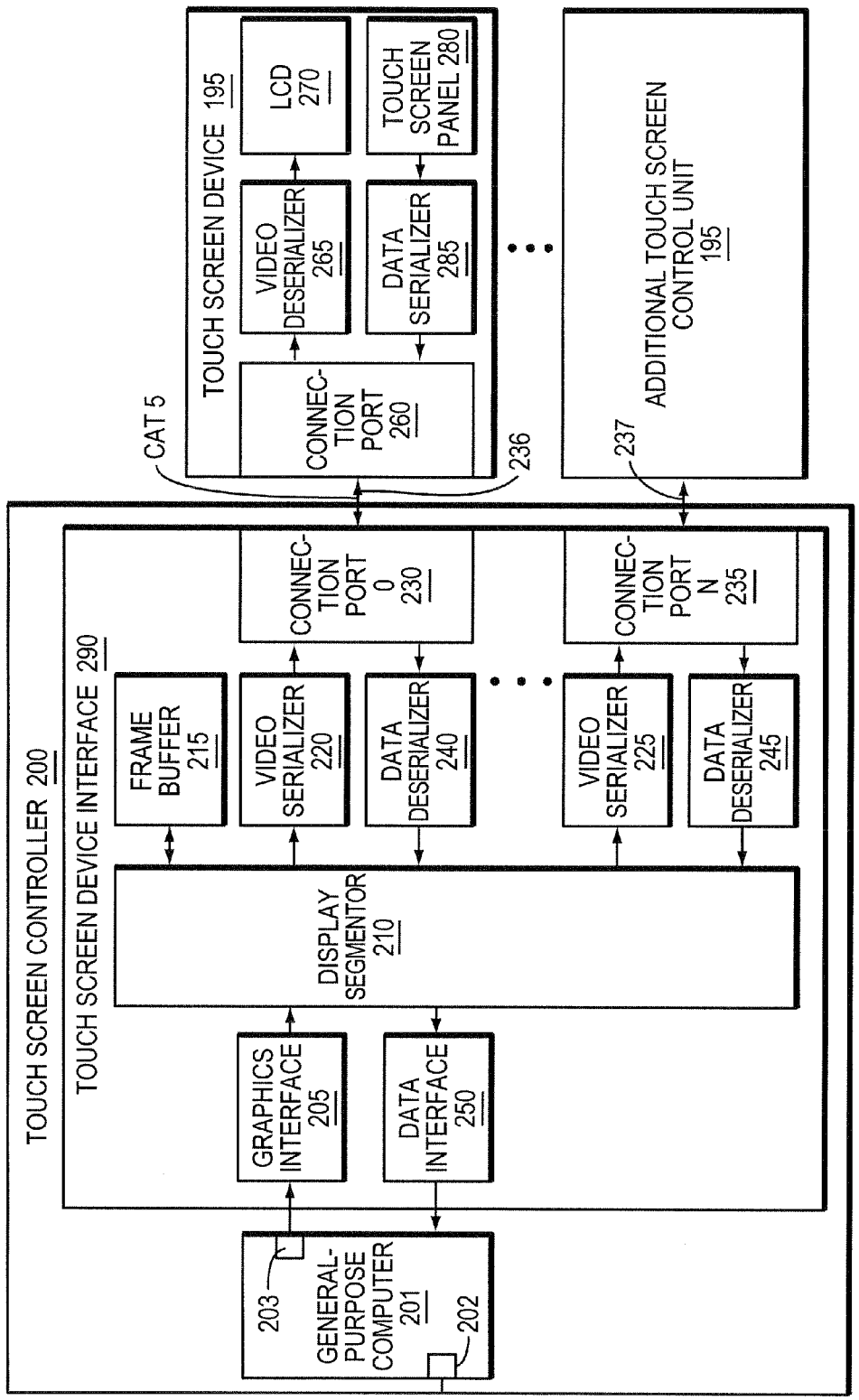
FIG. 2 is a schematic block diagram showing an enlarged view of an example touch screen controller, coupled to one or more example touch screen devices.

FIG. 2 is a schematic block diagram showing an enlarged view of an example touch screen controller 200, coupled to one or more example touch screen devices 195. The touch screen controller 200 may implement a novel technique for driving multiple touch screen devices from a single graphics signal, for example a single graphics output from a general-purpose computer 201 of the touch screen controller 200. The touch screen controller 200 may further implement a novel technique for mapping touch location information from multiple touch screen devices 195 into a single screen space, so that touch location information may be more readily processed.

In some configurations, the touch screen controller 200 may include a "general-purpose computer" 201. The term a "general-purpose computer," as used herein, refers to a device that is configured to execute a set of instructions, and depending upon the particular instructions executed, may perform a variety of different functions or tasks. Typically, but not always, a general-purpose computer 201 executes a general-purpose operating system, such as the Windows® operating system, available from Microsoft Corporation, the Linux® operating system, available from a variety of vendors, the OSX® operating system, available from Apple Inc., or another operating system. A general-purpose computer 201 may have any of a variety of form factors. For example, a general-purpose computer may be a Central Processing Unit (CPU) card, a Single Board Computer (SBC), a PC/104 processing module, a conventional ATX form factor motherboard and CPU, an "off-the-shelf" small form factor general-purpose personal computer including a case, power supply, and other accessories, an "off-the-shelf" large form factor general-purpose personal computer including a case, power supply, and other accessories, and/or a rack-mount general-purpose personal computer including a case, power supply, and other accessories. The general-purpose computer 201 may include a storage device, for example a hard drive, a compact disc read-only memory (CDROM) drive, a Flash memory, or other type of storage device, and/or may be interconnected to a storage device provided elsewhere in the touch screen controller 200.

The general-purpose computer 201 preferably has one or more interfaces 200 for communicating with an external device, such as the programmable multimedia controller 100. Further, the general-purpose computer 201 preferably has one or more graphics outputs 203, such as a Digital Visual Interface (DVI) port, analog Video Graphics Array (VGA) port, Apple Display Connector (ADC) port, or other type of port, for supplying graphics signals of one or more formats. For example, if a DVI port is employed, DVI graphics are preferable supplied according to a Transition Minimized Differential Signaling (TMDS) scheme and represented in a red, green, blue (RGB) color space with 24-bit color depth. The graphics signal supplied may be of any of a number of different display resolutions, for example it may be a Widescreen Ultra eXtended Graphics Array (WUXGA) graphics signal having a display resolution of 1920×1200 pixels, a Ultra-eXtended Graphics Array (UXGA) graphics signal having a display resolution of 1600×1200 pixels, a Super eXtended Graphics Array (SVGA) graphics signal having a display resolution of 1280×1024 pixels, or a graphics signal having another display resolution. Similarly, the graphics signal may include graphics of any of a variety of frame rates, for example 60 frames per second (fps), 72 fps, 75, fps, 85 fps, or another frame rate.

According to one embodiment, differences in display resolution may be used to allow a single graphics signal of the general-purpose computer 201 to drive multiple touch screen devices 195. As discussed above, a graphics signal from the general-purpose computer 201 may be of very high resolution, for example it may be WUXGA graphics having a display resolution of 1920×1200 pixels. Such resolution far exceeds the display resolution of many moderately sized LCDs suitable for use in wall-mount, table-top, or handheld touch screen devices 195. For example, many moderately sized LCDs suitable for such applications are configured to display Video Graphics Array (VGA) graphics having a display resolution of 640×480 pixels, Quarter Video Graphics Array (QVGA) graphics having a display resolution of 320×240 pixels, or other types of graphics with low display resolutions. As such, with proper segmenting, a single high resolution graphics signal from the general-purpose computer 201 may be used to drive the LCDs 270 of multiple touch screen devices 195 at lower display resolutions.

Figure 3:
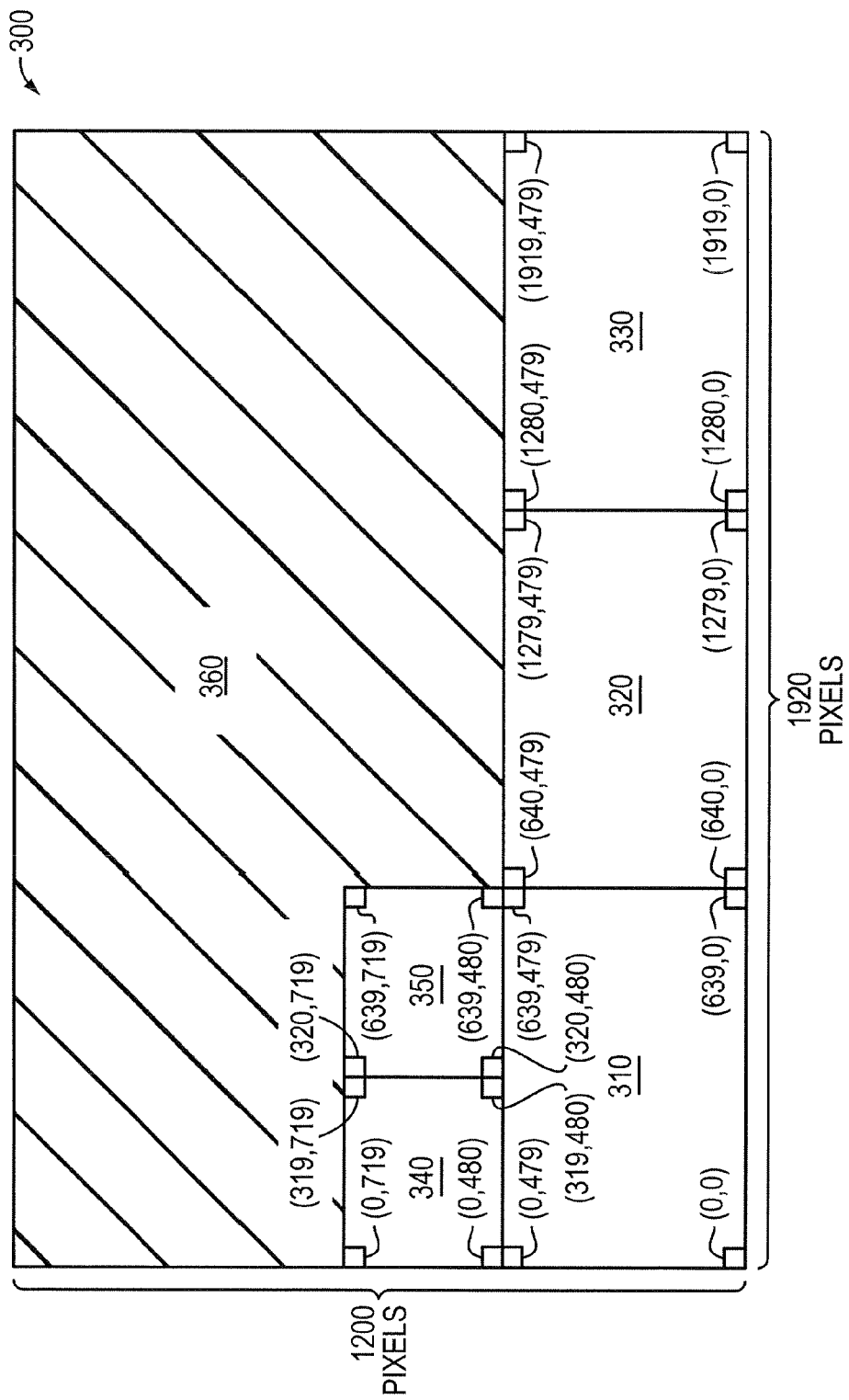
FIG. 3 is an example graphics frame divided into a plurality of example pixel groups, each pixel group associated with a particular touch screen device.

Referring to FIG. 3, a graphics signal from the general-purpose computer 201 is received by a graphics interface 205, for example a DVI interface, of the touch screen device interface 290. The graphics signal is then passed to a display segmentor 210, which may be a programmable logic device (PLD), for example a field programmable gate array (FPGA), yet alternately may be a purpose-built chip, such as an application specific integrated circuit (ASIC), a collection of several chips interconnected for example on a circuit board, or other type of device. The display segmentor 210 may temporarily store one or more graphics frames of the graphics signal in a frame buffer 215, for example a synchronous dynamic random access memory (SDRAM), while processing graphics frames. The display segmentor 210, in one embodiment, is configured to process a graphics frame in part by dividing the graphics frame into a number of pixel groups, and by mapping each pixel group to a particular touch screen device 195.

Such dividing is illustrated by reference to FIG. 3, which shows an example graphics frame 300 of a graphics signal divided into a plurality of example pixel groups 310-350, each pixel group associated with a particular touch screen device 195. Each pixel group is preferably sized to the display resolution of the LCD 270 of the associated touch screen device 195. For example, assuming the example frame 300 has a resolution of 1920×1200 pixels, several pixel groups 310, 320, 330 of 640×480 pixels each may be provided. Each such pixel group 310, 320, 330 contains sufficient pixel information to drive an individual VGA resolution LCD of a different touch screen device 195. Similarly, several pixel groups 340, 350 of 320×240 pixels each may be provided. Each such pixel group 340, 350 contains pixel information sufficient to drive an individual QVGA resolution LCD of a different touch screen device 195. While the example graphics frame 300 in FIG. 3 is shown divided into pixel groups of only two sizes, it should be apparent that pixel groups of virtually any size may be provided, up to the display resolution of the graphics frame. Thus LCDs 270 of a wide variety of resolutions may be simultaneously driven. Similarly, while the example graphics frame 300 in FIG. 3 is shown providing 5 pixel groups, with a substantial portion of the graphics frame occupied by blank space 360 (i.e., pixels that are not a part of any pixel group 310-350), one to n pixel groups may be provided, with n limited only by the resolution of the graphics frame and the resolution of the LCDs 270 to be driven. Finally, while the example graphics frame 300 of FIG. 3 is shown with pixel groups 310-350 arranged in abutting rows and columns, pixel groups 310-350 may be otherwise arranged, and may be, for example, separated by one or more "spacer" pixels.

Referring back to FIG. 2, the display segmentor 210 generates individual graphics signals from each pixel group. The individual graphics signals are each passed to an associated video serializer 220, 225 that encodes, serializes, and transmits the individual graphics over an associated interface, for example a connection port 230, 235 coupled to a transmission path 236, 237. The video serializers 220, 225 may be adapted to transmit graphics via Ethernet over a compatible transmission path, for example CAT5 cable. In such a configuration, electrical power may also be transmitted over the transmission path 236, 237, for example using Power of Ethernet (POE) technology. Alternately, a variety of other transmission modes may be employed, including other types of wired communications, for example USB or IEEE 1394 (i.e., FireWire®), or wireless communications, for example RF or WI-FI.

Each individual graphics signal is received at a connection port 260 of a touch screen device 195, and passed to a video deserializer 265 that decodes, deserializes, and otherwise processes the individual graphics signal so that it is suitable to drive a LCD 270. The LCD 270 thereafter displays the graphics embodied in the graphics signal. A touch screen panel 280 may be overlaid upon the LCD 270, to allow the LCD to function as an input device. The touch screen panel 280 may be a resistive system, a capacitive system, a surface acoustic wave system, or other type of touch panel system. When touched by a user, the touch screen panel 280 generates x-axis and y-axis coordinates corresponding to the location of the touch. The x-axis and y-axis coordinates are passed to a data serializer 285 and then passed through the connection port 260 back to the touch screen device interface 290 of the touch screen controller 200. Upon receipt at a connection port 230, 235, the x-axis and y-axis coordinates are passed to a data deserializer 240, 245 and on to the display segmentor 210.

The display segmentor 210 may be configured to implement a novel technique for mapping the x-axis and y-axis coordinates from multiple touch screen devices 195 into a single screen space. In response to the location in the graphics frame of the pixel group associated with the touch screen device 195 that supplied the x-axis and y-axis coordinates, offset values are calculated and then added to the x-axis and y-axis coordinates. The offset values map the x-axis and y-axis coordinates to new x-axis and y-axis coordinates in the screen space of the graphics frame. Appropriate offset values may readily be determined from the location of the pixel group associated with the touch screen device 195 in the graphics frame. For example, referring to the example graphics frame 300 in FIG. 3, suppose a touch screen device 195 associated with example pixel group 320 passes example x-axis and y-axis coordinates (10,10) to the display segmentor 210. The display segmentor 210 may map these coordinates to the screen space of the example graphics frame 300 by adding an x-axis offset of 640 and a y-axis offset of 0 to the coordinates, to yield new coordinates of (650,10) in the screen space of the example graphics frame 300. Similarly, suppose a touch screen device 195 associated with example pixel group 350 passes x-axis and y-axis coordinates (250, 80) to the display segmentor 210. The display segmentor 210 may map these coordinates to the screen space of the example graphics frame 300 by adding an x-axis offset of 320 and a y-axis offset of 480, to yield coordinates of (570, 560) in the screen space of the example graphics frame 300.

The newly generated x-axis and y-axis coordinates in the screen space of the graphics frame are passed to a device interface 250, for example a USB interface. The device interface 250 may pass the x-axis and y-axis coordinates to the general-purpose computer 201 that originated the single graphics signal, or alternately another device. The x-axis and y-axis coordinates may be interpreted by the general-purpose computer 201 as pointing device coordinates, for example mouse cursor coordinates. Such coordinates may be readily processed by a general-purpose operating system of the general-purpose computer 201, and compared to graphics frames, to determine user selections on the touch screen devices 195.

Figure 4:
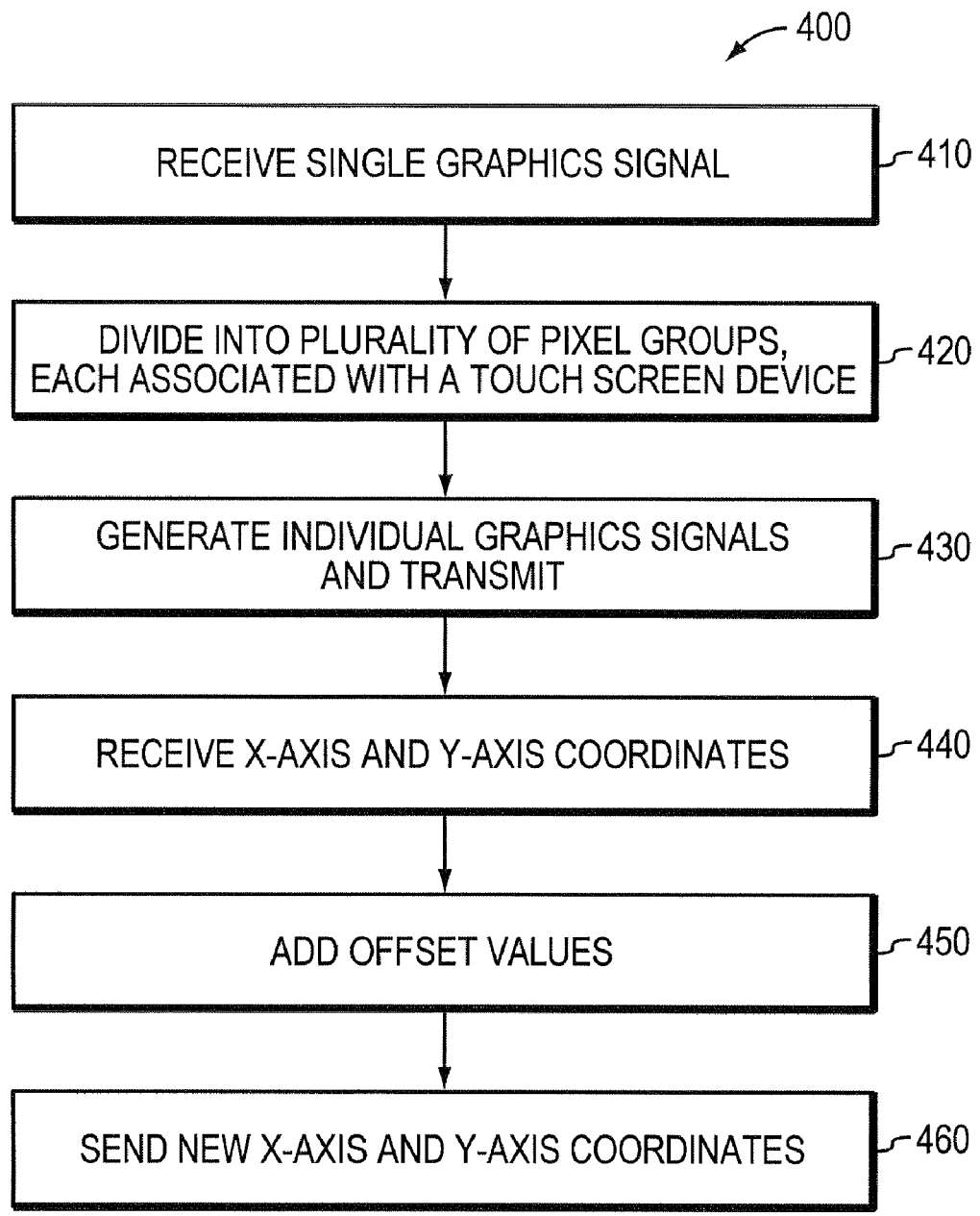
FIG. 4 is a flow diagram of an example series of steps that may be executed by an example touch screen device interface, to drive multiple touch screen devices from a single graphics signal and to map touch location information from multiple touch screen devices into a single screen space.

FIG. 4 is a flow diagram 400 of an example sequence of steps that may be executed by an example touch screen device interface 290, to drive multiple touch screen devices 195 from a single graphics signal, and to map touch location information from multiple touch screen devices into a single screen space. The flow diagram 400 summarizes certain aspects of the above description, and omits many details for purposes of clarity and simplicity. Accordingly, the reader is referred to the above descriptions if more detail is desired. At step 410, a single graphics signal is received at the touch screen device interface 290, for example from the general-purpose computer 210. At step 420, each frame of the single graphics signal is divided into a plurality of pixel groups, each pixel group associated with a particular touch screen device 195. At step 430, individual graphics signals are generated from each of the pixel groups and transmitted to the associated touch screen devices 195. At step 440, x-axis and y-axis coordinates corresponding to the location of a touch on one of the touch screen devices 195 is received. While step 440 is shown as following from step 430, there is not necessarily a time dependency between the steps, and they may occur simultaneously. At step 450, appropriate offset values are added to the x-axis and y-axis coordinates to map them to new x-axis and y-axis coordinates that are in the screen space of the graphics frame. Finally, at step 460 the new x-axis and y-axis coordinates that are in the screen space of the graphics frame sent to a device for further processing, for example to a general-purpose computer 201.

While the above description discusses certain embodiments of the present invention, it should be apparent that further modifications and/or additions may be made without departing from the invention's intended spirit and scope.

In an alternate embodiment, the display segmentor 290 may be configured to use differences in the frame rate to allow a single graphics signal to drive multiple touch screen devices 195. This alternate technique may be employed in addition to, or instead of, the above described techniques that utilizes a difference in display resolution to allow a single graphics signal to drive multiple touch screen devices 195. Often LCDs 270 of touch screen devices 195 are used to display fairly static and/or slow moving images, for example representations of icons, menus, text, and other features that have limited dynamic movement. Accordingly, a low frame rate, such as a frame rate of 5 frames per second (fps) may produce an acceptable visual presentation. Many devices, such as a general-purpose computer 201, however, are typically capable of generating a graphics signal with a much higher frame rate, for example 60 fps, 72 fps, 75 fps, 85 fps, etc.

According to an alternate embodiment, the display segmentor 290 may divide (e.g., demultiplex) a high frame rate graphics signal into a plurality of individual graphics signals of lower frame rate, for example by assigning every $n^{th}$ frame to a different individual graphics signal. In this manner, a plurality of different individual graphics signal may be generated from the single graphics signal. The individual graphics signal may be distributed to different touch screen devices 195 as described above. Similarly, the coordinates of touches on the touch screen panels 280 of different touch screen devices 195 may be combined (e.g., multiplexed) together into a single screen space by the display segmentor 290.

Further, while the above description describes the novel techniques for driving and receiving data from multiple touch screen devices as used with a programmable multimedia controller 100, it should be remembered that the techniques are in no way limited to such use, and are widely applicable to a variety of different environments. For example, the techniques may be employed with other types of automation and home control equipment, with various A/V devices, with a stand-alone general-purpose computer, with special-purpose processing devices, or in any of a variety of other settings.

Further, while the above description discusses the single graphics signal being provided from a general-purpose computer 201 of the touch screen controller 200, it should be remembered that the signal may alternately be provided from a variety of other sources. For example, the signal may be provided by an external general-purpose computer that transmits the signal to the touch screen controller 200, or provided from some other signal source.

Further, while the above description discusses a LCD 270 employed in each touch screen device 195, it should be apparent that other display technology may alternately be employed, for example cathode ray tube (CRT) technology, zenithal bistable device (ZBD) technology, plasma display panel (PDP) technology, and/or other display technology.

Further, while the above description discusses intimates that each touch screen device 195 is external to the touch screen controller 200, one or more of the touch screen devices 195 may be internal to the touch screen controller 200. For example, a front panel display of the touch screen controller 200 may treated as a touch screen device 195, and be driven according to the techniques described above.

Further, while the above description discusses driving and receiving data from multiple touch screen devices 195, the techniques disclosed herein are also applicable to a single touch screen device 195. In one implementation, a system may initially be provided with only a single touch screen device 195. This system may later be expanded by adding additional touch screen devices 195.

Further, while the above description discusses the advantage of obviating the need for a general-purpose computer to be present in each touch screen device 195, additional and/or alternate advantages may be obtained. For example, data for display on different touch screen devices 195 may be more readily interchanged and processed when a single general-purpose computer is employed. For example, status and state information may be more readily unified, such that each touch screen device 195 presents a consistent and up to date system level view.

Further, while the above description refers to a variety of specific hardware units for executing various functions, it should be remembered that many of the techniques discussed herein may alternately be implemented by a variety of different hardware structures (for example a variety of different programmable logic circuits, specially-designed hardware chips, analog or partially-analog devices, and other types of devices), may be implemented in software (for example as computer-executable instructions stored in a computer-readable storage media for execution on a processor), or may be implemented in a combination of hardware and software. Accordingly, it should be remembered that the above descriptions are meant to be taken only by way of example.

What is claimed is:

1. An apparatus for driving a plurality of touch screen devices from a single graphics signal, comprising:
 a general-purpose computer configured to provide a graphics signal of a particular display resolution, the graphics signal including a plurality of graphics frames;
 a display segmentor configured to divide a first portion of each graphics frame of the graphics signal into a plurality of pixel groups, while a second portion of each graphics frame is not a part of any pixel group of the plurality of pixel groups, each pixel group associated with a particular touch screen device of the plurality of touch screen devices, the display segmentor further configured to generate an individual graphics signal from each pixel group of the first portion of each graphics frame but not from the second portion of each graphics frame, each individual graphics signal having a display resolution that is lower than the particular display resolution; and
 one or more interfaces configured to transmit each individual graphics signal to a different touch screen device of the plurality of touch screen devices, and to receive coordinates from each touch screen device corresponding to user touches on the respective touch screen device, wherein the display segmentor is further configured to map the coordinates received from each touch screen device to coordinates of a single screen space by adding offset values to the coordinates from at least some of the touch screen devices and to provide the coordinates of the single screen space to the general purpose computer.

2. The apparatus of claim 1, wherein each pixel group is sized to a display resolution of a display on the associated particular touch screen device.

3. The apparatus of claim 2, wherein two or more of the pixel groups of the plurality of pixel groups are differently sized, to provide for differing display resolutions of associated touch screen devices.

4. The apparatus of claim 2, wherein the display is a liquid crystal display (LCD).

5. The apparatus of claim 1, wherein each graphics frame includes at least some pixels in the second portion of the graphics frame that are not a part of any pixel group of the plurality of pixel groups.

6. The apparatus of claim 1, further comprising:
 one or more video serializers configured to serialize at least some of the individual graphics signals for transmission over Ethernet transmission paths; and
 wherein the at least some of the one or more interfaces are connection ports to Ethernet transmission paths.

7. The apparatus of claim 1, wherein the graphics signal of the particular display resolution is a Digital Visual Interface (DVI) graphics signal.

8. The apparatus of claim 1, wherein the particular display resolution is 1920 by 1200 pixels, and wherein at least one of the individual graphics signals has a display resolution of 640 by 480 pixels.

9. The apparatus of claim 1, wherein the coordinates include x-axis coordinates and y-axis coordinates, and the offset values comprise first offset values that are added to the x-axis coordinates and second offset values that are added to the y-axis coordinates, to create new x-axis coordinates and new y-axis coordinates.

10. The apparatus of claim 9, wherein the first and second offset values are generated in response to the location in each graphics frame of the pixel group associated with the touch screen device that supplied the x-axis coordinates and the y-axis coordinates.

11. A method for driving a plurality of touch screen devices from a single graphics signal, comprising:
 providing a graphics signal of a particular display resolution, the graphics signal including a plurality of graphics frames;
 dividing a first portion of each graphics frame of the graphics signal into a plurality of pixel groups, while a second portion of each graphics frame is not a part of any pixel group of the plurality of pixel groups, each pixel group associated with a particular touch screen device of the plurality of touch screen devices;
 generating an individual graphics signal from each pixel group of the first portion of each graphics frame but not from the second portion of each graphics frame, each individual graphics signal having a display resolution that is lower than the particular display resolution;
 transmitting each individual graphics signal to a different touch screen device of the plurality of touch screen devices;
 receiving coordinates from each touch screen device corresponding to user touches on the respective touch screen device;
 mapping the coordinates received from each touch screen device to coordinates of a single screen space by adding offset values to the coordinates from at least some of the touch screen devices; and
 providing the coordinates of the single screen space to a general purpose computer.

12. The method of claim 11, further comprising:
 sizing each pixel group to a display resolution of a display on the associated particular touch screen device.

13. The method of claim 12, wherein the step of sizing further comprises:
 providing two or more of the pixel groups of the plurality of pixel groups to be differently sized, to provide for differing display resolutions of associated touch screen devices.

14. The method of claim 11, further comprising:
 including at least some pixels in the second portion of the graphics frame that are not a part of any pixel group of the plurality of pixel groups.

15. The method of claim 11, further comprising:
 serializing at least some of the individual graphics signals for transmission over Ethernet transmission paths.

16. The method of claim 11, wherein the coordinates include x-axis coordinates and y-axis coordinates, and the offset values comprise first offset values that are added to the x-axis coordinates and second offset values that are added to the y-axis coordinates, to create new x-axis coordinates and new y-axis coordinates.

17. The method of claim 16, further comprising:
 generating the first and second offset values in response to the location in each graphics frame of the pixel group associated with the touch screen device that supplied the x-axis coordinates and the y-axis coordinates.

18. An apparatus for driving a plurality of touch screen devices from a single graphics signal, comprising:
 means for providing a graphics signal of a particular display resolution, the graphics signal including a plurality of graphics frames;
 means for dividing a first portion of each graphics frame of the graphics signal into a plurality of pixel groups, while a second portion of each graphics frame is not a part of any pixel group of the plurality of pixel groups, each pixel group associated with a particular touch screen device of the plurality of touch screen devices, means for generating an individual graphics signal from each pixel group of the first portion of each graphics frame but not from the second portion of each graphics frame, each individual graphics signal having a display resolution that is lower than the particular display resolution;

means for transmitting each individual graphics signal to a different touch screen device of the plurality of touch screen devices;

means for receiving coordinates from each touch screen device corresponding to user touches on the respective touch screen device;

means for mapping the coordinates received from each touch screen device to coordinates of a single screen space by adding offset values to the coordinates of at least some of the touch screen devices; and means for providing the coordinates of the single screen space to a general purpose computer.

* * * * *